T. E. ADAMS.
ELECTRIC ARC LAMP.
APPLICATION FILED JULY 8, 1909.

1,058,514.

Patented Apr. 8, 1913.
8 SHEETS—SHEET 1.

Fig. 1.

WITNESSES

INVENTOR
T. E. Adams
Attorney

T. E. ADAMS.
ELECTRIC ARC LAMP.
APPLICATION FILED JULY 8, 1909.

1,058,514.

Patented Apr. 8, 1913.
8 SHEETS—SHEET 3.

UNITED STATES PATENT OFFICE.

THOMAS EDGAR ADAMS, OF CLEVELAND, OHIO, ASSIGNOR TO THE ADAMS-BAGNALL ELECTRIC COMPANY, OF CLEVELAND, OHIO.

ELECTRIC-ARC LAMP.

1,058,514.   Specification of Letters Patent.   Patented Apr. 8, 1913.

Application filed July 8, 1909. Serial No. 506,587.

*To all whom it may concern:*

Be it known that I, THOMAS E. ADAMS, a resident of Cleveland, in the county of Cuyahoga and State of Ohio, have invented certain new and useful Improvements in Electric-Arc Lamps; and I do hereby declare the following to be a full, clear, and exact description of the invention, such as will enable others skilled in the art to which it appertains to make and use the same.

This invention relates to improvements in electric arc lamps and more particularly to such as are adapted for use with metallic electrodes, the object of the invention being to construct the operating mechanism in such manner that it will operate to free the electrodes of insulating scoriaceous deposits and thus permit the lamp to properly start.

A further object is to provide regulating and controlling mechanism for an arc lamp which will operate to bring the metallic electrodes into forcible engagement and to repeat such action until the scoriaceous deposits shall be sufficiently removed from the ends of the electrodes to permit proper electrical contact of the latter with each other.

A further object is to provide an arc lamp in which the arc shall be established by the manipulation of the upper electrode, and in which the upward feeding of the lower electrode to maintain the arc shall be controlled directly by the movements of the holder of the upper electrode.

A further object is to provide an arc lamp in which the upward feeding of the lower electrode to maintain the arc shall be effected mechanically by the movement of the upper electrode.

A further object is to provide means which shall be operated to mechanically raise the lower electrode, and to so construct and arrange such mechanical means that it shall be rendered active to raise the lower electrode by means movable with the upper electrode.

A further object is to construct an arc lamp with mechanical operating means for positively engaging the lower electrode carrier to raise said electrode and to provide the carrier of the upper electrode with means for positively actuating said mechanical operating means.

A further object is to provide an arc lamp in which electrical means are provided for controlling the upper electrode in establishing and regulating the arc and in which the lower electrode is fed upwardly by mechanical means actuated by means movable with the upper electrode.

With these and other objects in view, the invention consists in certain novel features of construction and combinations of parts as hereinafter set forth and pointed out in the claims.

In the accompanying drawings; Fig. 5$^a$ is an elevation at right angles to Fig. 5 looking from left to right of the latter.

1 represents a tube which may constitute a portion of the lamp casing and inclose a portion of the mechanism of the lamp. To the lower end of this tube, an annular casting 2 is secured and supports a series of resistance coils 3 which are utilized in the operation of the lamp as hereinafter described. The casting 2 also supports a cover-reflector for a globe 4, suitable means being provided for removably holding the latter in place with its upper edge disposed within the depending peripheral flange 5 of the cover. In the present instance, the globe is provided in its bottom with an opening 6 for the admission of air, and this opening is covered by means of a pan 7 supported in the bottom of the globe to receive slag from the lower metallic electrode. The pan 7 is provided on its bottom with projections 7$^a$ to prevent the same from closely fitting the bottom of the spherical portion 7ᵇ of the globe and closing the opening therein, and to further guard against too greatly restricting the passage of air into and through the globe, the pan 7 is provided with openings 7ᶜ which are overhung by lips 7ᵈ to prevent the escape of slag through said openings. The globe cover is made with a central opening 8 disposed in line with the lower end of the tube 1 and permits the escape of fumes from the arc upwardly through said tube.

A hood 9, which may consist of a casting of iron or other suitable metal is secured to the upper end of the tube 1 and is provided centrally with an opening surrounded by an annular flange 10 having a laterally projecting portion 11 for a purpose which will hereinafter appear. A cap 12, which may be conveniently made of brass, is secured to the annular flange 10 and provided with a series of posts 13 to which a top plate 14 is secured. A suitable device 15 is attached to the top plate 14, by means of which the lamp may be suspended from a suitable support. With the arrangement of parts above described, it is apparent that air entering the globe will pass upwardly through the tubular casing 1, carrying with it, fumes from the arc, (which latter, as will be hereinafter pointed out, is located in proximity to the opening in the center of the globe cover), such fumes escaping to the outer air through the spaces formed by the posts 13 under the top plate 14.

A plate or frame 16 is supported by the hood 9, and between this plate and a yoke 17 two magnets 18—19 are supported, the yoke 17 being made to partially embrace the tube 1 and having its ends connected and braced by means of a rod 20. The yoke 17 is also secured to the poles of the magnets and connected with the supporting plate 16 under the hood 9 by means of rods 21. The magnets 18—19 are provided with coarse wire coils 22 included in the working circuit of the lamp and with fine wire coils 23 included in a shunt circuit so as to form parts of an electrically differential regulator mechanism. The armature 24 for the magnets 18—19 is carried by a yoke 25 pivotally supported by the fixed yoke 17 and embracing the tube 1. For the purpose of steadying the movements of the armature yoke, an air pot 26 is provided and suspended from the hood 9, the rod 27 carrying the plunger for this air pot, being connected to the armature yoke at the end thereof opposite the armature.

The carrier 28 for the upper metallic electrode 29 is located in the tube 1 and comprises two elongated members 30—31 spaced apart and rigidly connected together by cross bars 32, 33—34. The members 30—31 of the upper electrode holder are provided at their lower ends with jaws 35 between which the slotted shank 36 of the upper electrode 29 is disposed. Blocks 37 placed against the jaws 35 are provided with lips 38 disposed between the lower ends of the jaws and the body of the electrode, and through the blocks 36, the jaws 35 and the slotted shank of the electrode, a clamping bolt 39 is passed. One end of this bolt is provided with a head 41 to engage a lug 40 on one of the blocks 36 and the other end of said bolt is threaded for the reception of a nut 42. Plates 43 are secured to but insulated from the respective members 30—31 of the electrode carrier, and provided with flanges 44 which coöperate with buttons or projections 45 on the inner face of the tube 1, to guide the electrode carrier in its vertical movements and maintain it at all times in proper alinement with the lower electrode. The member 30 of the carrier 28 also carries a fixed arm 46 having a head of insulating material for a purpose hereinafter explained. An arm or plate 47 is secured to the member 31 of the carrier 28 and electrically connected therewith, said arm serving as means for connecting the upper electrode in the lamp circuit. A rod 48, having its lower portion disposed between the members 30—31 of the carrier 28, is secured at its lower end to but insulated from the lower cross bar 32 of said carrier 28 and passes through an insulated bushing 49 in the upper cross bar 34 at the upper end of the carrier. The rod 48 extends upwardly from the carrier 29 and its upper portion is bent to form a downwardly projecting arm 50 which passes within the lateral portion 11 of the flange 10 on the head 9 and then through a hole in the latter,—the free end of said arm 50 terminating outside the tube 1 and between the magnets 18—19.

Secured to and depending from the plate or frame 16 and disposed between the magnets 18—19, is a small magnet 51, to the lower end of which, an arm or plate 52 (preferably of non-magnetic material) is secured and provided with a hole in which the pole of the magnet is located. The arm or plate 52 is provided at one end with a depending lug 53 and near its other end (which projects laterally from the frame of magnet 51) a hole 54 is provided for the passage of the depending arm 50 of the rod 48. An arm 55 projects laterally from the frame of magnet 51 so as to be disposed a short distance above the arm or plate 52 and this arm 55 is made with a hole which alines with the hole in the arm 52 for the passage of the arm 50 of rod 48. Between the arms 52 and 55, a ring clutch 56 encircles the arm 50 of rod 48 and normally rests near its edge upon a lug 57 projecting upwardly from the arm 52. A spring actuated pin 58 carried by the frame of magnet 51 presses upon the ring clutch at a point diametrically opposite the engagement of the latter with the lug 57 so as to assure the proper engagement of said clutch with the arm 50 of rod 48 to hold the same against the weight of the parts which it carries and maintain the upper electrode elevated and out of contact with the lower electrode when the lamp is not in circuit. The plate 52 is provided at or near one end with lugs 59 between which an armature 60 for the magnet 51 is pivotally supported. This armature carries, at its free end, a pin 62 which passes through the arm or plate 52 adjacent to the hole 54 in the latter, and engages the ring clutch 56 at a point directly below the engagement of the spring-pressed pin 58 with the latter. The pin 62 is provided with a head to limit the downward movement of the armature. The electrically controlled clutch devices above described are especially valuable for sustaining the upper electrode and holding it out of contact with the lower electrode, upon the extinguishment of the lamp, so as to prevent the welding of the electrodes together while they are hot, which is liable to occur when metallic electrodes (such as employed in flaming arc lamps) are permitted to remain in contact after the arc has been extinguished.

During the normal operation of the lamp, the electrically controlled clutch devices will be maintained inactive by the operation of the magnet 51, which is included permanently during such period, in the working lamp circuit.

The upper electrode will be made of material which offers comparatively low electrical resistance, preferably an alloy of copper and tin, and the lower electrode 63 will be of ferro-titanium or similar material suitable for use in a lamp of the flaming arc type.

The lower electrode 63 is maintained in a holder 64 at the lower end of a blade or carrier 65. For the accommodation of this blade, a tube 66 is located within the tube 1 of the casing and at its upper end the tube 66 is provided with a head having a pin 67 which enters a socket in the cap 12. The lower end of the tube 66 is secured to and communicates with a housing 67 secured to the bottom annular casting 2 of the lamp frame, and this housing is provided with a depending hollow arm 68 for the passage of the blade 65. The arm 68 is also made with a tubular portion 69 for the passage of a conductor 70, by means of which the lower electrode 63 is included in the lamp circuit. An oscillatory spindle 71 is mounted in the housing 67 and provided at one side with an arm 72 and at the other side with fingers 73, the latter straddling the blade 65 which passes through the housing at one side of the spindle 71 therein. Below the spindle 71, a clutch plate 74 is located and provided at one side of its center with a slot for the passage of the blade 65, said plate being adapted to rest at the other side of its center upon a pin or support 75 within the housing 67, said clutch plate thus acting normally to prevent descent of the blade 65 and the lower electrode carried thereby. Another clutch plate 76 is disposed within the housing 67 and provided at one side of its center with a slot for the passage of the blade or arm 65 and against this clutch plate at the opposite side of its center, a spring 77 bears. This spring serves to maintain the upper clutch plate 76 normally horizontal with its respective ends resting upon the arm 72 and fingers 73 of the spindle 71,—in which position of the clutch plate 76, the arm of blade 65 carrying the lower electrode, can have free movement, such movement in a downward direction being prevented however, by the action of the lower clutch plate 74. The spindle 71 is provided at one end with a crank arm 78 located exteriorly of the housing 67 and in the path of the arm 46 on the upper electrode carrier.

With clutch devices such as above described, for the lower electrode carrier, when crank arm 78 of the spindle 71 is depressed, said spindle will be partially rotated, causing its arm 72 to raise one end of the clutch plate 76 against the resistance of the spring 77. The plate 76 will immediately clutch the blade or arm 65 and as the crank arm 78 continues its downward movement and the spindle continues to turn, the arm 72 of the spindle will raise said plate 76 bodily and thus elevate the blade 65 and the lower electrode carried thereby. When the spindle is thus operated, the fingers 73 will press upon the lower clutch plate 74 and depress the end thereof through which the blade 65 passes, (the tendency of said plate 74 being to rise when the blade 65 is raised) so that said clutch plate 74 will be in position to immediately grip the blade when the spindle 71 and the upper clutch plate 76 are permitted to be moved to their normal positions by the action of the spring 77.

Normally, when the lamp is not in circuit, the electrodes will be separated, and the controlling mechanism is so constructed and arranged both electrically and mechanically that when current first enters the lamp, the upper electrode will be raised and then immediately dropped. When the upper electrode thus falls, the insulated head on the arm 46 projecting from the carrier 28 will engage the crank arm 78 of the spindle 71 and the clutch devices within the housing 67 will be operated as above described to raise the lower electrode a short distance. The mechanism will continue to raise the upper electrode and permit it to drop until the upper electrode strikes the lower electrode and if the accumulation of scoriaceous material on the electrodes is such as will electrically insulate one from the other, the upper electrode will continue to reciprocate, and continuously striking upon the lower electrode after the manner of the operation of a trip hammer, will effectually remove scoriaceous matter from the lower electrode and jar insulating deposits from the lower end of the upper electrode until current will be permitted to pass from one electrode to the other, after the lower electrode has been raised sufficiently to meet the upper electrode when the latter drops, the subsequent downward or dropping movements of said upper electrode will be limited and the arm 46 on the carrier 28 will be prevented from fully depressing the crank arm 78 of the spindle 71 of the clutch devices for the lower electrode and hence, after the electrodes have come together, the upward feeding operation of said clutch devices will be stopped during the hammering of the upper upon the lower electrode. As soon as sufficient current is permitted to pass from one electrode to the other, an arc will be drawn between them and regulated until a finger 104 moves a switch arm 88 far enough to start the upper electrode pounding to raise the lower electrode. This occurs before the arm 46 rests on the crank arm 78. This establishing, regulating and feeding continues until the electrodes have been consumed, when this has occurred, the lamp may be automatically cut out by the engagement of a part carried by the negative electrode carrier with a part connected with the plus terminal of the lamp.

To accomplish the operations above described, the mechanism now to be described is employed: The plus and minus terminals of the lamp mechanism are indicated at 79 and 80 respectively. The terminal binding post 79 is connected by a suitable conductor 81 with one terminal of the coarse wire windings of the regulator magnets and the other terminal of said coarse wire windings is electrically connected, by means of a conductor 82 with an arm or binding post 84 sustained by but insulated from a bracket 85 supported by the fixed yoke 17. Two contacts 86—87 are supported by the bracket 85 and upon the shank of one of these contacts, the arm or binding post 84 is supported but insulated therefrom. The upper end of a switch arm 88 is disposed between the contacts 86 and 87 and the lower end of this arm is mounted upon a pin 89 projecting from the fixed yoke 17,—said switch arm having sufficient frictional engagement with the pin causes it to remain in the position between the contacts 86—87 to which it may be moved as presently explained. The switch arm 88 is provided near its upper end with electrically connected contacts 90 to coöperate with one or the other of the fixed contacts 86 or 87, and the contacts 90 are connected, by means of a conductor 91, with the arm or binding post 84. A small electro-magnet 92 is disposed over the bracket 85 and with this magnet, a pendulous armature 93 coöperates. This armature depends below the magnet 92 and is provided with a contact 94 which is insulated therefrom and is normally pressed (when the magnet 92 is not energized) against a contact 95, by means of a spring 96. The contact 95 is carried by a conductor bar or bracket 99 which serves to electrically connect it with the contact 86. The contact 94 is electrically connected with the arm or binding post 84 by means of a conductor 98, and said arm or binding post is also electrically connected with one terminal of the coil of magnet 92. The other end of the coil of this magnet is connected by means of a conductor 99 with the arm 47 of the upper electrode carrier 28. The conductor bar or bracket 97 is connected by a wire 100 with one terminal of the cut-out resistance 3, and the other terminal of this resistance is connected with a binding post 101 and the latter is connected by means of the conductor 70 with the lower electrode holder. The binding post 101 is also connected by means of a conductor 102 with one terminal of the coil of the clutch magnet 51, the other end of said coil being electrically connected with the minus terminal binding post. 80. The contact 87 is connected, by means of a conductor 103 with the plus terminal binding post 79 of the lamp, so that when the switch lever 88 is moved to cause its contact 90 to engage the contact 87, the regulator magnets 18—19 will be short circuited. One terminal of the fine wire windings of the regulator magnets is connected with the plus terminal 79 of the lamp and the other end of said fine wire winding is connected with the conductor bar or bracket 97, which latter is connected with the minus terminal of the lamp as before explained, so that the fine wire windings will be in a constantly closed circuit shunting the arc. The pivoted yoke 25 which carries the armature 24 for the regulator magnets is provided with two fingers 104—105, the former of which engages the switch lever 88 to maintain the engagement of the contacts 90—86 when the armature 24 and its yoke 25 are in their lowest positions and the regulator magnets 18—19 are not energized. A spring 114 bearing against the switch lever 88 will operate to move said lever and separate one of the contacts 90 from the contact 86 when the finger 104 moves away from said switch lever.

It has been hereinbefore explained that the arm 50 which depends from the upper end of the rod 48 secured to the upper electrode carrier 28, passes through the electrically controlled clutch 56, by the action of which latter the upper electrode is held elevated above the lower electrode when the lamp is out of circuit. After passing through the clutch 56, the depending arm 50 enters a guide tube 106, and the latter is provided at its lower end with an enlargement 107 which is loosely mounted upon a knife-edge bearing plate 108 secured to the pivoted yoke 25 in proximity to the armature 24. Displacement of the tubular guide 106 from the bearing plate 108, is prevented by means of a bent arm 109 secured to the enlargement 107 and projecting under said bearing plate. The enlargement 107 of the guide tube 106 is provided with lugs between which one end of an arm 110 is pivoted and to the other end of this arm, a clutch lever 111 is pivotally attached. One end of the clutch lever is made with a clutch ring 112, disposed over the top of the guide tube 106 to permit the passage of the arm 50 of rod 48, through it, and said clutch ring is caused to normally grip said arm 50, by the action of a spring 113. Thus it will be seen that the yoke 25 and its armature 24 are connected with the arm 50 of rod 48 by means of the clutch devices above described, so that when the armature rises, the upper electrode will be raised until the clutch lever 111 engages the depending lug 53, when the clutch lever will be tripped and the upper electrode carrier permitted to drop.

Figure 1:
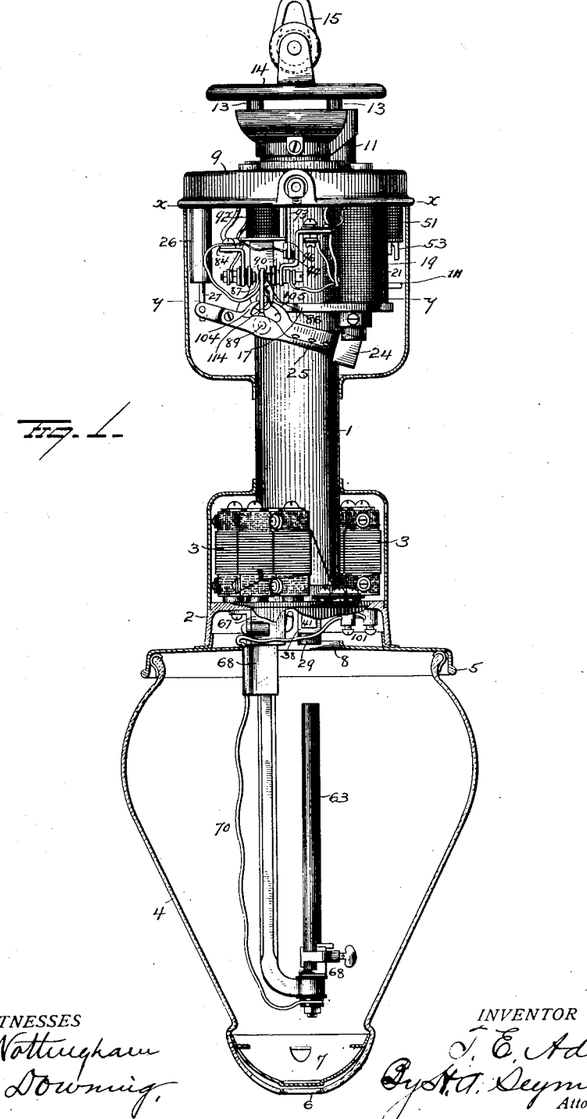
Figure 1 is an elevation partly in section of the lamp.
Figure 2:
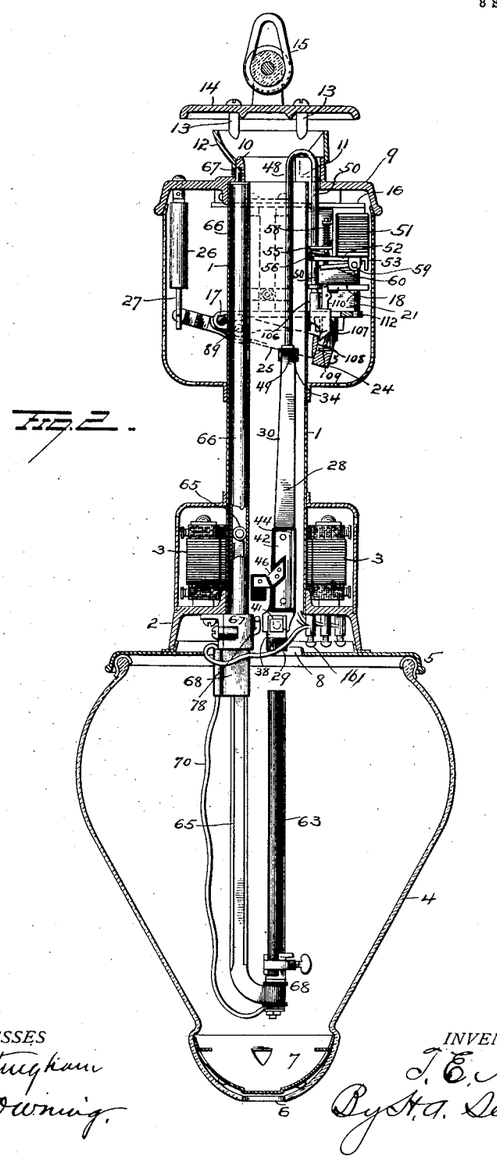
Fig. 2 is a vertical sectional view.
Figure 3:
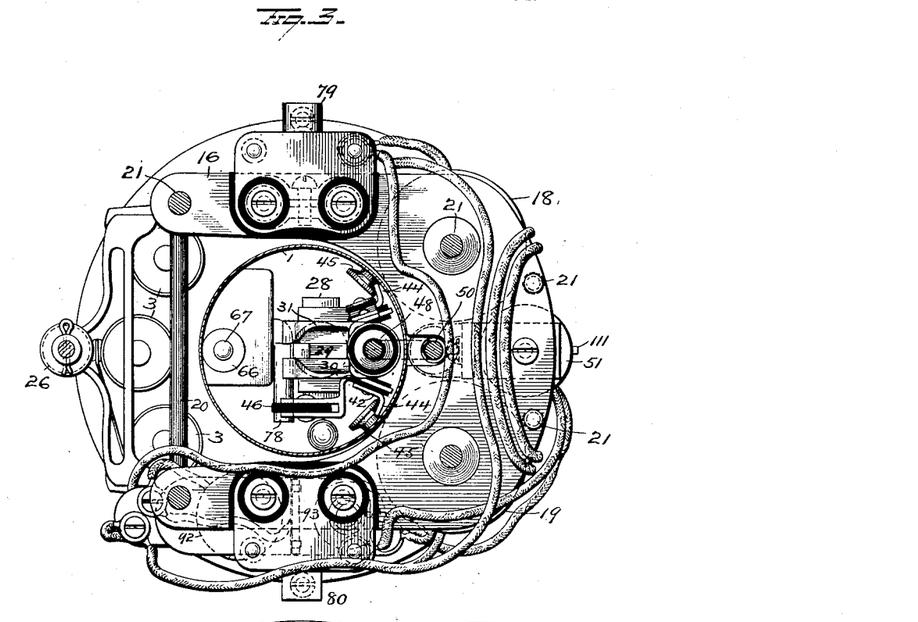
Fig. 3 is a horizontal section on the line $x$—$x$ of Fig. 1.
Figure 4:
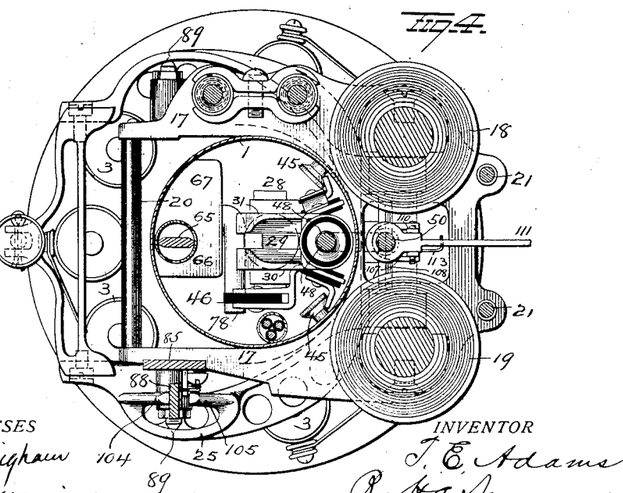
Fig. 4 is a sectional view on the line $y$—$y$ of Fig. 1.
Figure 5:
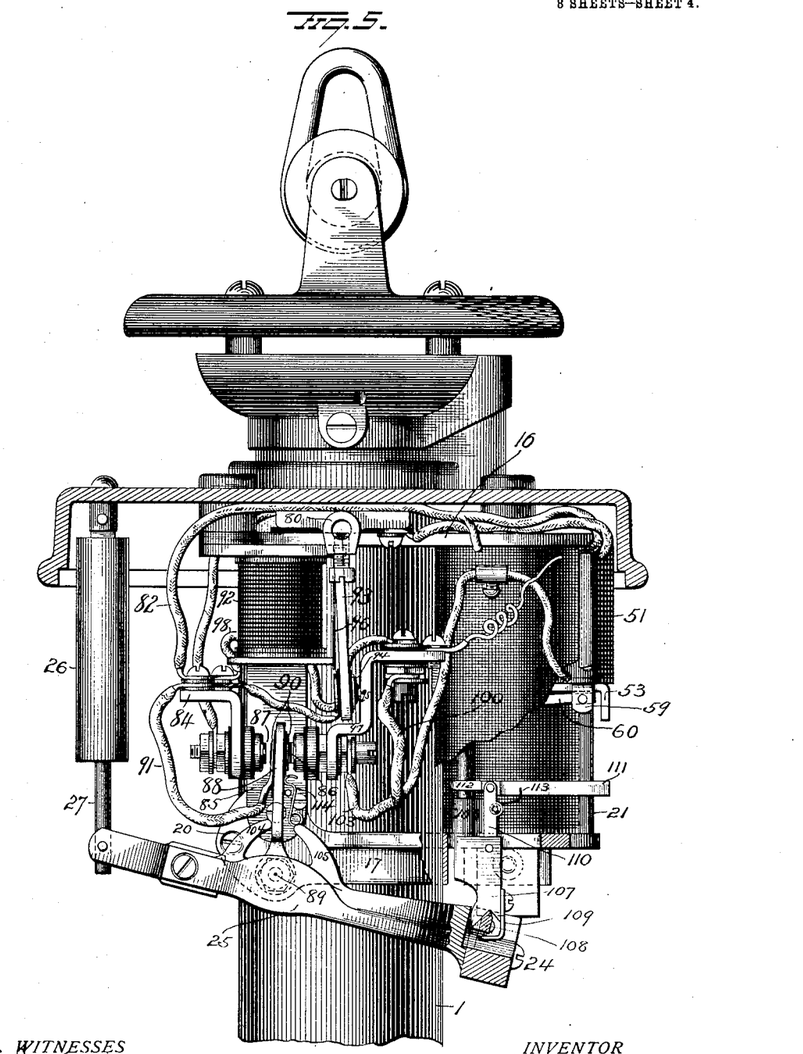
Fig. 5 is an enlarged detail view of the regulator mechanism.
Figure 5A:
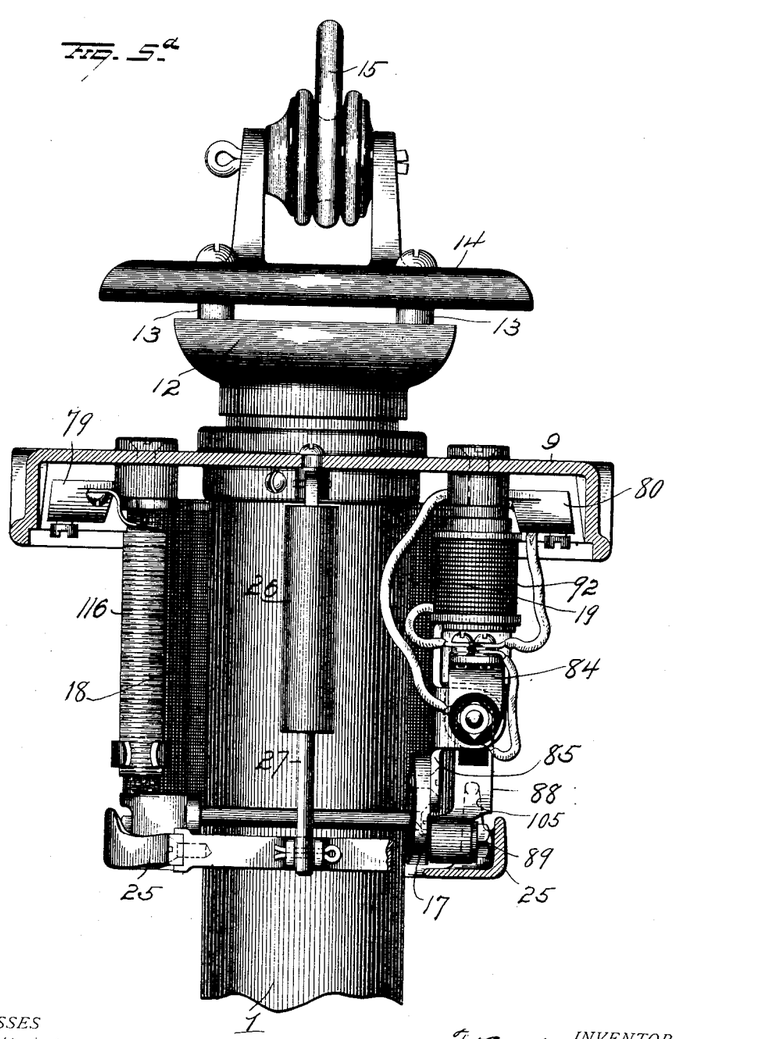
Figure 6:
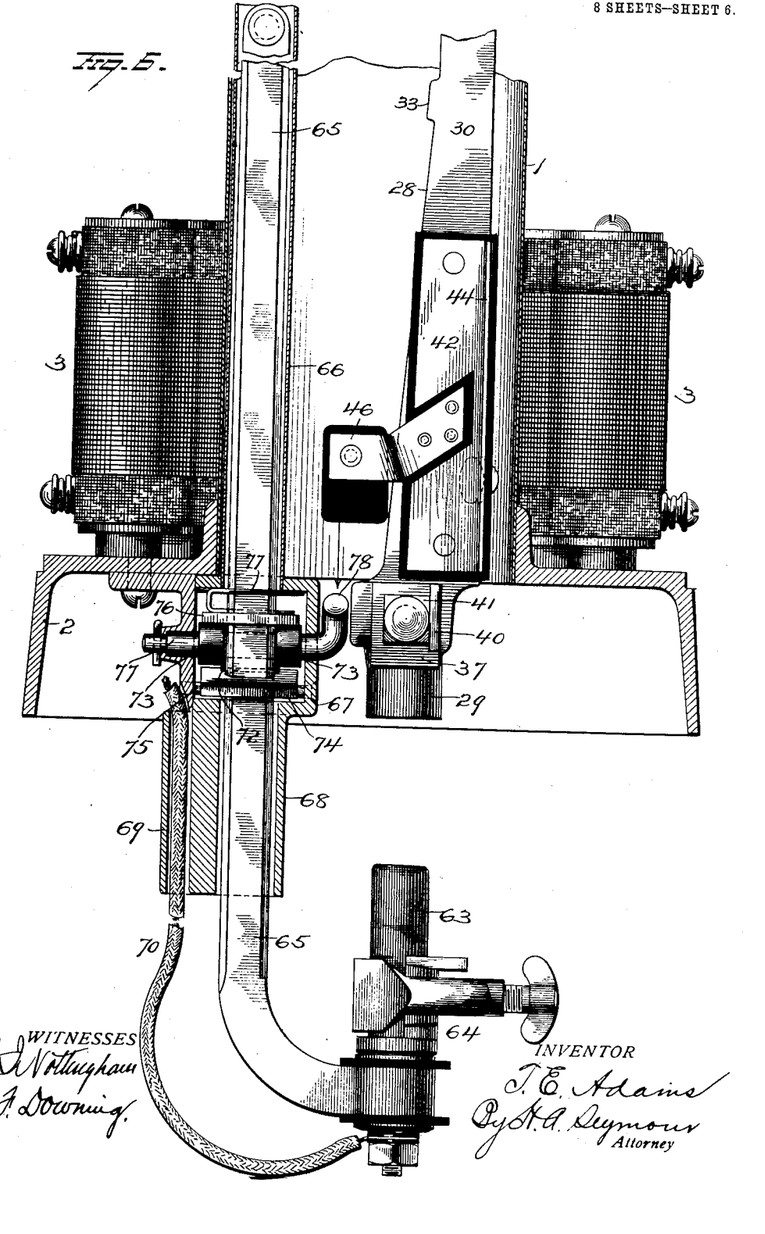
Fig. 6 is an enlarged sectional view showing the lower portion of the lamp.
Figures 7, 8, 9, 10, 11, 12:
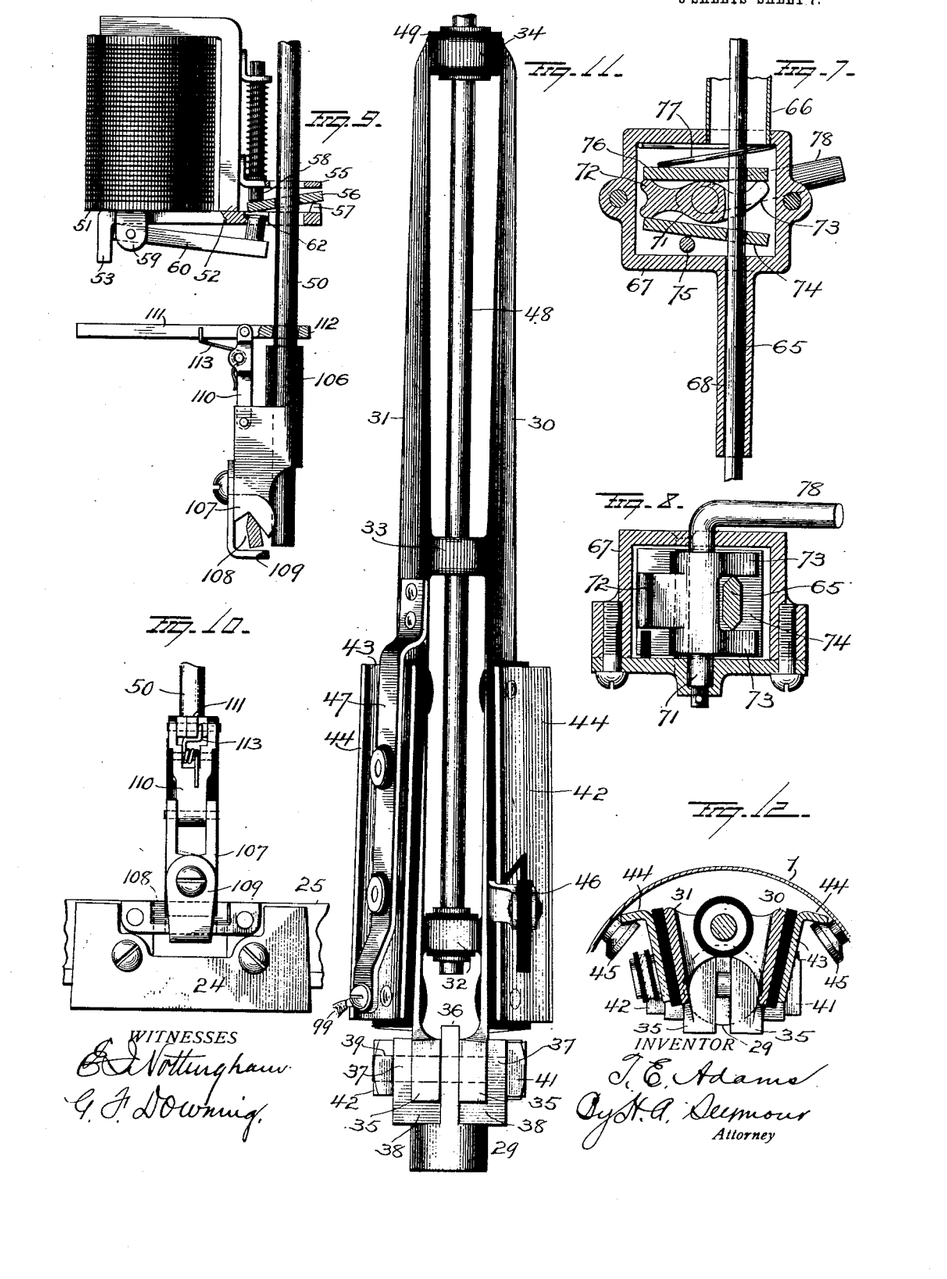
Figs. 7 and 8 are enlarged sectional views of the devices which control the operation of the lower electrode.
Fig. 9 is a detail view showing the clutches for the upper electrode carrier.
Fig. 10 is a detail view showing the connection of the clutch arm 111 with the armature yoke 25.
Fig. 11 is an enlarged view of the upper electrode carrier.
Fig. 12 is a detail view showing the guide devices for the upper electrode carrier.
Figure 13:
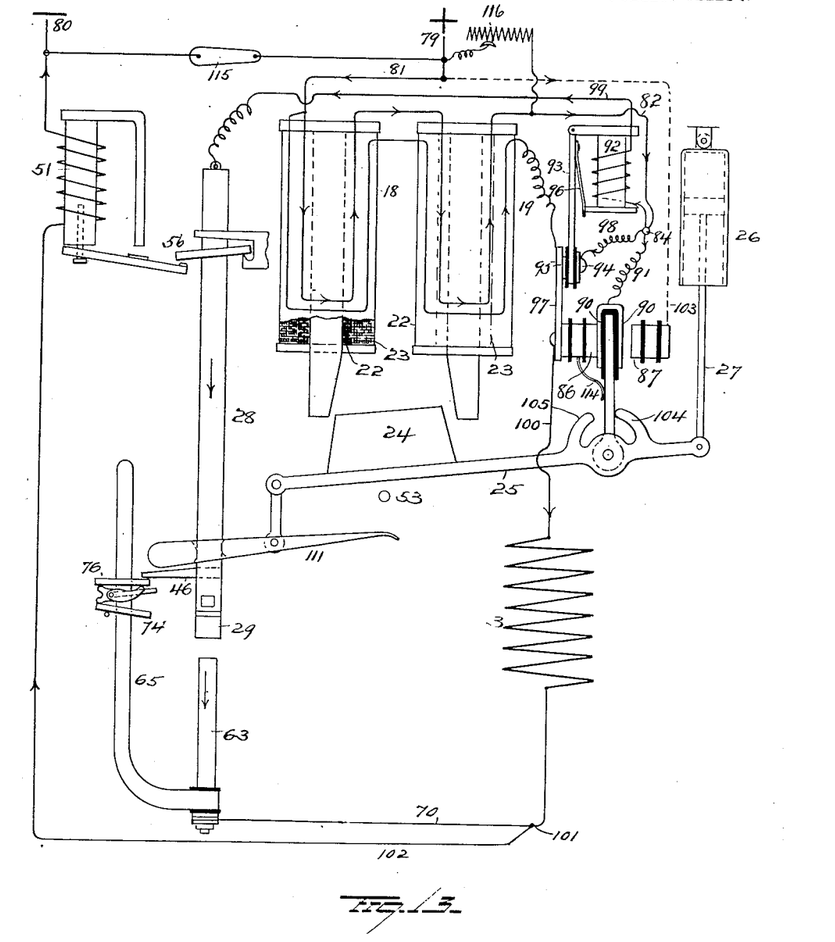
Fig. 13 is a diagrammatical view.

When the manually operated cut-out switch 115 (shown only in the diagram, Fig. 13) is opened, the current will pass through the coarse wire coils of the regulator magnets 18—19 and then by conductor 82 to the arm or binding post 84. The current will then pass to the conductor bar 97 through the conductors 91—98 and contacts 94—95 and 90—86. The current will then pass through the resistance 3 and then by the conductor 102 to and through the coil of magnet 51 and finally to the negative terminal 80 of the lamp. The controller magnets 18—19 will now be energized to raise the armature 24 and its yoke 25, and at the same time, the magnet 51 will be energized to lift the clutch 56 and release it from gripping contact with the arm 50 connected with the upper electrode carrier, but the clutch 112 carried by the armature yoke 25 will immediately grip said arm 50 and as said yoke is moved upwardly by the action of the regulator magnets, the upper electrode will be raised. As soon as the armature yoke begins to rise, the finger 104 will move away from the switch lever 88, and the spring 114 will promptly move said switch lever so as to electrically separate one of its contacts 90 from the contact 86, thus opening one of the parallel circuits between the arm or binding post 84 and the conductor bar 97. The armature yoke 25 and upper electrode will continue to rise until the lever 111 of clutch 112 engages the lug or stop 53, when the clutch 112 will be tripped and the upper electrode carrier released, permitting the upper electrode to be dropped upon the lower electrode. The weight of the electrode carrier 28 and rod 48, added to that of the upper electrode, will cause the latter to strike the lower electrode with sufficient force to dislodge more or less of the insulating, scoriaceous deposits which may be adhering to said electrodes. When the upper electrode has been tripped and permitted to drop, as above described, the continued upward movement of the armature yoke 25 will cause its finger 105 to engage the switch lever 88 and move the same so as to bring one of its contacts 90 into engagement with the contact 87. The circuit including the conductor 103 will now be closed and the regulator magnets 18—19 short-circuited. The armature 24 and yoke 25 will now descend, causing the finger 104 to engage the switch lever 88 and shift the same so as to open the short circuit and close the circuit between the arm or binding post 84 and the contact 86 on the bar 97. Assuming that the insulating scoriaceous material on the electrodes was sufficient to prevent the passage of current from the upper to the lower electrode, when the upper electrode was dropped as above described, the same operations of raising the upper electrode and dropping it upon the lower electrode will be repeated, and these trip hammer actions of the upper upon the lower electrode will continue until the insulating deposits on the electrodes shall have been sufficiently removed to render the contacting ends of the electrodes conductive and thus permit the passage of current from one to the other. Current will now be permitted to traverse the circuit including the coil of magnet 92 and the coarse coils of the regulator magnets in series with each other and the magnet 92 will thus be energized to move its armature 93 and open the contacts 94—95. At the same time, the armature 24 will be drawn up by the regulator magnets 18—19 and the upper electrode will be separated from the lower to establish the arc between them,—the cut-out circuit including the resistance 3 being opened as soon as the armature 24 begins to rise, by the separation of the contacts 90—86. The coils of magnets 51 and 92 being in the main circuit during the normal operation of the lamp, these magnets will remain energized,—the former to maintain the clutch 56 in released position, and the latter to maintain the circuit of the resistance 3 open. The arc will be maintained at the proper voltage by the movements of the armature 24 as controlled by the electrical differential between the coarse wire main coils and the fine wire shunt coils of the regulator magnet.

The strength of the main current in the coarse wire coils of the regulator magnets may be varied by means of an adjustable resistance 116 located in a circuit shunting said coils. The upward feeding of the lower electrode as the latter becomes consumed, is effected by the engagement of the arm 46 on the upper electrode carrier, with the crank arm 78 on spindle 71 to operate the clutch devices in the housing 67 and raise the blade 65 and the lower electrode carried thereby, as previously explained. Should the lower electrode be a considerable distance below the upper electrode when current first enters the lamp, the clutch devices in the housing 67 will be operated to raise the lower electrode step by step until it is in position to be struck by the reciprocating upper electrode, the reciprocations of the upper electrode then continuing until the ends of the electrodes are rendered conductive by the absence of scoriaceous material,—all as hereinbefore explained. The regulator mechanism outside of the tubular portion 1 of the lamp frame, may be protected by means of a suitable shell or cover 117, and the resistance coils 3 may be protected by a cover 118.

Various slight changes in details of construction might be made without departing from the spirit of my invention or limiting its scope and hence I do not wish to restrict myself to the precise details herein set forth.

Having fully described my invention what I claim as new and desire to secure by Letters-Patent, is:—

1. In an electric arc lamp, the combination with metallic electrodes, of a clutch for the upper electrode, means for raising and lowering said clutch continuously while no current is passing through the electrodes, and means for tripping the clutch each time it is thus raised, whereby the upper electrode will be a number of times successively dropped upon the lower electrode.

2. In an electric arc lamp, the combination with metallic electrodes, of a clutch for the upper electrode, electrically controlled means for reciprocating said clutch continuously while the electrodes are out of circuit, and means for tripping said clutch each time the same is raised to release the upper electrode and drop the same upon the lower electrode.

3. In an electric arc lamp, the combination with metallic electrodes, of a clutch for the upper electrode, electrically controlled means for raising and lowering said clutch and tripping the same while the electrodes are not in circuit to drop the upper electrode, and means tending to feed the lower electrode upwardly when the upper electrode drops.

4. In an electric arc lamp, the combination with metallic electrodes, of a clutch for the upper electrode, means for raising and lowering said clutch continuously for starting the lamp, means for tripping the clutch each time it is thus raised, whereby the upper electrode will be a number of times successively dropped upon the lower electrode, and devices movable with the upper electrode and serving to increase the weight thereof to increase the force of the blow of said upper electrode upon the lower electrode.

5. In an electric arc lamp, the combination with metallic electrodes, of a magnet, an armature therefor, a clutch connected with the armature and vertically movable bodily therewith, means for tripping the clutch to release the upper electrode when in a raised position, and means for short circuiting said magnet after the clutch has been tripped and for opening the short circuit after the armature shall have been released.

6. In an electric arc lamp, the combination with metallic electrodes and a clutch for the upper electrode, of a magnet, a pivoted lever, an armature carried by the latter, means connecting the armature lever to said clutch for raising the latter and the upper electrode, means for tripping the clutch when the same has been raised by the armature lever to release the upper electrode and to permit it to fall freely, and switch devices controlled by the movements of the armature lever to short circuit said magnet after the clutch has been tripped and to open the short circuit after the armature shall have been released.

7. In an electric arc lamp, the combination with metallic electrodes, of a magnet, a pivoted lever, an armature for the magnet carried by said lever, a clutch for the upper electrode connected with said lever and movable vertically therewith to raise the upper electrode, a circuit shunting said magnet, a switch included in said circuit, means for tripping said clutch when the latter is in raised position to release the upper electrode and to permit it to fall freely, and means controlled by the armature lever for closing and then opening said switch after the clutch has been tripped, during the upward and downward movements respectively of said lever.

8. In an electric arc lamp, the combination with a vertically movable upper electrode carrier, and a vertically movable lower electrode carrier, of a clutch engaging the lower electrode carrier, operating means engaging said clutch for raising the same and the lower electrode carrier, and means movable with the upper electrode carrier and in position to engage the operating means of said clutch to raise the latter and the lower electrode carrier when said upper electrode carrier descends.

9. In an electric arc lamp, the combination with a frame and a housing carried thereby, of a lower electrode carrier passing through said housing, a clutch plate located within said housing and engaging the lower electrode carrier, a spindle mounted in said housing and having an arm to engage said clutch plate, a crank arm on said spindle exteriorly of the housing, an upper electrode carrier, and an arm on the upper electrode carrier to engage said crank arm and actuate the spindle and clutch plate to raise the lower electrode carrier.

10. In an electric arc lamp, the combination with a frame and a housing supported by the lower portion thereof, of a spindle mounted in said housing, clutch plates disposed above and below the spindle, a support in the housing for one of said clutch plates, projections on respective sides of the spindle between the clutch plates, a spring bearing against the upper clutch plate, a lower electrode carrier passing through the housing and the two clutch plates therein, a crank arm on said spindle, an upper electrode carrier, and an arm on said upper electrode carrier for engaging said crank arm to operate the spindle and the upper clutch plate to positively raise the lower electrode holder.

11. An electric arc lamp comprising metallic electrodes, mechanism for controlling and regulating the electrodes to maintain a normal arc, and means associated with the regulating and controlling mechanism for repeatedly raising and releasing the upper electrode and permitting it to drop by gravity upon the lower electrode until the electrodes make electrical contact with each other.

In testimony whereof, I have signed this specification in the presence of two subscribing witnesses.

THOMAS EDGAR ADAMS.

Witnesses:
  J. H. WORBS,
  JOHN R. ORPUTT.